US008538373B2

(12) United States Patent
Koontz et al.

(10) Patent No.: US 8,538,373 B2
(45) Date of Patent: Sep. 17, 2013

(54) METHODS AND APPARATUS FOR EMERGENCY TRACKING

(75) Inventors: Michael Koontz, Chantilly, VA (US); Andrew Tran, Herndon, VA (US); James Sherman, Penn Laird, VA (US); Jake Gunderson, Clearwater, FL (US)

(73) Assignee: Blackbird Technologies, Inc., Herndon, VA (US)

( * ) Notice: Subject to any disclaimer, the term of this patent is extended or adjusted under 35 U.S.C. 154(b) by 0 days.

(21) Appl. No.: 13/115,680

(22) Filed: May 25, 2011

(65) Prior Publication Data

US 2012/0302197 A1    Nov. 29, 2012

(51) Int. Cl.
*H04M 11/04* (2006.01)

(52) U.S. Cl.
USPC ............... 455/404.2; 455/404.1; 455/456.1

(58) Field of Classification Search
None
See application file for complete search history.

(56) References Cited

U.S. PATENT DOCUMENTS

| | | | |
|---|---|---|---|
| 4,977,577 A | 12/1990 | Arthur et al. | |
| 5,223,844 A | 6/1993 | Mansell et al. | |
| 5,363,402 A | 11/1994 | Harmon | |
| 5,377,222 A | 12/1994 | Sanderford, Jr. | |
| 5,517,199 A | 5/1996 | DiMattei | |
| 5,535,430 A | 7/1996 | Aoki et al. | |
| 5,608,412 A | 3/1997 | Welles, II et al. | |
| 5,633,875 A | 5/1997 | Hershey et al. | |
| 5,670,745 A | 9/1997 | Yajima et al. | |
| 5,841,396 A | 11/1998 | Krasner | |
| 5,841,398 A | 11/1998 | Brock | |
| 5,867,481 A | 2/1999 | Miyagi | |
| 5,875,181 A | 2/1999 | Hsu et al. | |
| 5,899,957 A | 5/1999 | Loomis | |
| 5,909,196 A | 6/1999 | O'Neill, Jr. | |
| 5,940,379 A | 8/1999 | Startup et al. | |
| 6,121,922 A | 9/2000 | Mohan | |
| 6,141,560 A | 10/2000 | Gillig et al. | |
| 6,148,340 A | 11/2000 | Bittinger et al. | |
| 6,166,627 A | 12/2000 | Reeley | |
| 6,208,302 B1 | 3/2001 | Jacob | |
| 6,215,498 B1 | 4/2001 | Filo et al. | |

(Continued)

FOREIGN PATENT DOCUMENTS

EP    1 189 409    3/2002

OTHER PUBLICATIONS

International Search Report and Written Opinion mailed Oct. 17, 2012 for PCT Application No. PCT/US2012/039241, filed May 24, 2012.
Asset Tracking Device, Laird Technologies®, © 2009, 2 pages.

*Primary Examiner* — Erika A Washington
(74) *Attorney, Agent, or Firm* — Cooley LLP (57) ABSTRACT

An apparatus includes a set of network communication modules, a communication control module and an input actuator. Each network communication module from the set of network communication modules is configured to send signals to and receive signals from a remote device via a distinct communication mode from a set of communication modes. The communication control module is configured to periodically send a set of second status signals intended to be sent to the remote device via each communication mode from the set of communication modes when the communication control module is in an emergency operating mode and the communication mode is available. The communication control module is configured to switch from the default operating mode to the emergency operating mode in response to receiving an input signal indicating that the input actuator has been actuated.

23 Claims, 4 Drawing Sheets

(56) References Cited

U.S. PATENT DOCUMENTS

| | | |
|---|---|---|
| 6,222,483 B1 | 4/2001 | Twitchell et al. |
| 6,223,225 B1 | 4/2001 | Bisdikian et al. |
| 6,252,544 B1 | 6/2001 | Hoffberg |
| 6,327,533 B1 | 12/2001 | Chou |
| 6,363,320 B1 | 3/2002 | Chou |
| 6,377,210 B1 | 4/2002 | Moore |
| 6,545,606 B2 | 4/2003 | Piri et al. |
| 6,611,229 B2 | 8/2003 | Muramatsu et al. |
| 6,615,253 B1 | 9/2003 | Bowman-Amuah |
| 6,657,587 B1 | 12/2003 | Mohan |
| 6,669,985 B2 | 12/2003 | Adams et al. |
| 6,677,858 B1 | 1/2004 | Faris et al. |
| 6,804,602 B2 | 10/2004 | Impson et al. |
| 6,810,293 B1 | 10/2004 | Chou et al. |
| 6,850,844 B1 | 2/2005 | Walters et al. |
| 6,853,917 B2 | 2/2005 | Miwa |
| 6,857,016 B1 | 2/2005 | Motoyama et al. |
| 6,859,831 B1 | 2/2005 | Gelvin et al. |
| 6,882,274 B2 | 4/2005 | Richardson et al. |
| 6,888,498 B2 | 5/2005 | Brenner et al. |
| 6,934,630 B2 | 8/2005 | Linstrom et al. |
| 6,975,222 B2 | 12/2005 | Krishan et al. |
| 6,975,941 B1 | 12/2005 | Lau et al. |
| 6,998,985 B2 | 2/2006 | Reisman et al. |
| 7,027,808 B2 * | 4/2006 | Wesby .................... 455/419 |
| 7,034,678 B2 | 4/2006 | Burkley et al. |
| 7,065,446 B2 | 6/2006 | Chou |
| 7,069,025 B2 | 6/2006 | Goren et al. |
| 7,072,668 B2 | 7/2006 | Chou |
| 7,080,322 B2 | 7/2006 | Abbott et al. |
| 7,099,770 B2 | 8/2006 | Naden et al. |
| 7,102,510 B2 | 9/2006 | Boling et al. |
| 7,113,864 B2 | 9/2006 | Smith et al. |
| 7,138,914 B2 | 11/2006 | Culpepper et al. |
| 7,155,335 B2 | 12/2006 | Rennels |
| 7,202,801 B2 | 4/2007 | Chou |
| 7,245,216 B2 | 7/2007 | Burkley et al. |
| 7,277,048 B2 | 10/2007 | Hessing |
| 7,337,061 B2 | 2/2008 | Naden et al. |
| 7,453,356 B2 | 11/2008 | Bedenko |
| 7,460,871 B2 | 12/2008 | Humphries et al. |
| 7,487,042 B2 | 2/2009 | Odamura |
| 7,492,251 B1 * | 2/2009 | Katz .................... 340/539.22 |
| 7,501,949 B2 | 3/2009 | Shah et al. |
| 7,502,619 B1 | 3/2009 | Katz |
| 7,515,071 B2 | 4/2009 | Kong et al. |
| 7,525,425 B2 | 4/2009 | Diem |
| 7,535,417 B2 | 5/2009 | Atkinson |
| 7,636,560 B2 | 12/2009 | Ku |
| 7,646,292 B2 | 1/2010 | Johnson |
| 7,746,228 B2 | 6/2010 | Sensenig et al. |
| 7,750,801 B2 | 7/2010 | Culpepper et al. |
| 7,783,304 B2 | 8/2010 | Himmelstein |
| 7,804,394 B2 | 9/2010 | Battista |
| 7,843,335 B2 | 11/2010 | Furey et al. |
| 7,924,153 B1 | 4/2011 | Furey et al. |
| 7,966,105 B2 | 6/2011 | McAden |
| 7,970,534 B2 | 6/2011 | Loftus et al. |
| 8,060,389 B2 | 11/2011 | Johnson |
| 8,099,235 B2 | 1/2012 | Loftus et al. |
| 8,130,096 B2 | 3/2012 | Monte et al. |
| 8,144,008 B2 | 3/2012 | Furey et al. |
| 8,155,640 B1 | 4/2012 | Battista et al. |
| 2002/0016539 A1 | 2/2002 | Michaelis et al. |
| 2002/0055817 A1 | 5/2002 | Chou |
| 2002/0097181 A1 | 7/2002 | Chou et al. |
| 2002/0123352 A1 | 9/2002 | Vayanos et al. |
| 2002/0169539 A1 | 11/2002 | Menard et al. |
| 2002/0177465 A1 | 11/2002 | Robinett |
| 2002/0177476 A1 | 11/2002 | Chou |
| 2003/0013091 A1 | 1/2003 | Dimitrov |
| 2003/0043761 A1 | 3/2003 | Hladik |
| 2003/0050038 A1 | 3/2003 | Haave et al. |
| 2004/0024644 A1 | 2/2004 | Gui et al. |
| 2004/0116134 A1 | 6/2004 | Maeda et al. |
| 2004/0142678 A1 | 7/2004 | Krasner |
| 2004/0147220 A1 | 7/2004 | Vaddiparty et al. |
| 2004/0196182 A1 | 10/2004 | Unnold |
| 2004/0204825 A1 | 10/2004 | Maruyama et al. |
| 2005/0052290 A1 | 3/2005 | Naden et al. |
| 2005/0066044 A1 | 3/2005 | Chaskar et al. |
| 2005/0066871 A1 | 3/2005 | Shelton |
| 2005/0093741 A1 | 5/2005 | Liou |
| 2005/0101350 A1 | 5/2005 | Wang |
| 2005/0135516 A1 | 6/2005 | Javor et al. |
| 2005/0160062 A1 | 7/2005 | Howard et al. |
| 2005/0174235 A1 | 8/2005 | Davis et al. |
| 2005/0187710 A1 | 8/2005 | Walker |
| 2005/0285782 A1 | 12/2005 | Bennett |
| 2006/0007038 A1 | 1/2006 | Boling et al. |
| 2006/0009216 A1 | 1/2006 | Welnick et al. |
| 2006/0022867 A1 | 2/2006 | Hessing |
| 2006/0142052 A1 | 6/2006 | Lai et al. |
| 2006/0202817 A1 | 9/2006 | Mackenzie et al. |
| 2006/0220841 A1 | 10/2006 | Culpepper et al. |
| 2006/0234693 A1 | 10/2006 | Isidore et al. |
| 2006/0252999 A1 | 11/2006 | Devaul et al. |
| 2006/0293850 A1 | 12/2006 | Ahn et al. |
| 2007/0046459 A1 | 3/2007 | Silverman et al. |
| 2007/0064833 A1 | 3/2007 | Sahota |
| 2007/0123174 A1 | 5/2007 | Wiessner et al. |
| 2007/0159388 A1 | 7/2007 | Allison et al. |
| 2007/0213092 A1 | 9/2007 | Geelen |
| 2007/0239321 A1 | 10/2007 | McAden |
| 2007/0241901 A1 | 10/2007 | Cage et al. |
| 2007/0244631 A1 | 10/2007 | Jung et al. |
| 2008/0018496 A1 | 1/2008 | Tanner et al. |
| 2008/0040244 A1 | 2/2008 | Ricciuti et al. |
| 2008/0266054 A1 | 10/2008 | Crank |
| 2008/0288986 A1 | 11/2008 | Foster et al. |
| 2009/0215424 A1 * | 8/2009 | Petite .................... 455/404.1 |
| 2009/0243943 A1 | 10/2009 | Mumbru et al. |
| 2009/0264094 A1 * | 10/2009 | Smith .................... 455/404.2 |
| 2010/0075643 A1 | 3/2010 | Cooper et al. |
| 2011/0205023 A1 | 8/2011 | Furey et al. |
| 2011/0319048 A1 * | 12/2011 | Matlock .................... 455/404.1 |

\* cited by examiner

```
┌─────────────────────────────────────┐
│ Automatically determine, at a       │
│ communication control module, an    │
│ availability of a communication     │
│ network from a set of               │
│ communication networks.             │
│ 502                                 │
└─────────────────────────────────────┘
                  ↓
┌─────────────────────────────────────┐
│ Receive a first input signal        │
│ indicating that a first input       │
│ actuator has been actuated.         │
│ 504                                 │
└─────────────────────────────────────┘
                  ↓
┌─────────────────────────────────────┐
│ Send, based on the first input      │
│ signal, a first status signal to a  │
│ remote device via the communication │
│ network from the set of             │
│ communication networks.             │
│ 506                                 │
└─────────────────────────────────────┘
                  ↓
┌─────────────────────────────────────┐
│ Receive a second input signal       │
│ indicating that a second input      │
│ actuator has been actuated.         │
│ 508                                 │
└─────────────────────────────────────┘
                  ↓
┌─────────────────────────────────────┐
│ Switch, in response to the second   │
│ input signal, the communication     │
│ control module from a default mode  │
│ to an emergency mode.               │
│ 510                                 │
└─────────────────────────────────────┘
                  ↓
┌─────────────────────────────────────┐
│ Periodically send, when the         │
│ communication control module is in  │
│ the emergency mode, a set of        │
│ second status signals to the remote │
│ device via each communication       │
│ network from the set of             │
│ communication networks.             │
│ 512                                 │
└─────────────────────────────────────┘
                  ↓
┌─────────────────────────────────────┐
│ Receive an acknowledgement signal   │
│ from the remote device indicating   │
│ that the remote device received at  │
│ least one second status signal from │
│ the set of second status signals.   │
│ 514                                 │
└─────────────────────────────────────┘
                  ↓
┌─────────────────────────────────────┐
│ Disable the communication control   │
│ module in response to receiving the │
│ acknowledgement signal.             │
│ 516                                 │
└─────────────────────────────────────┘
```

FIG. 5

METHODS AND APPARATUS FOR EMERGENCY TRACKING

GOVERNMENT LICENSE RIGHTS

This invention was made with government support under Contract Number N41756-09-C-4538 awarded by the Department of the Navy, Navy Engineering Logistics Office (NELO). The government has certain rights in the invention.

BACKGROUND

Some embodiments described herein relate generally to emergency tracking, and, in particular, to methods and apparatus for using a mobile device for emergency tracking.

Known tracking devices can be used to track a status and/or position of an asset. Such known tracking devices can provide status and/or location data to a remote device via a network. In some instances, however, a network may be unavailable. In such instances, known tracking devices can suspend transmission until the network is once again available. This can be unacceptable when the tracking device is attempting to transmit time sensitive emergency information to the remote device.

Accordingly, a need exists for a tracking device that provides an improved emergency protocol that can transmit status and/or location information to a remote device via multiple communication networks.

SUMMARY

An apparatus includes a set of network communication modules, a communication control module and an input actuator. Each network communication module from the set of network communication modules is configured to send signals to and receive signals from a remote device via a distinct communication mode from a set of communication modes. The communication control module is configured to periodically send a set of second status signals intended to be sent to the remote device via each communication mode from the set of communication modes when the communication control module is in an emergency operating mode and the communication mode is available. The communication control module is configured to switch from the default operating mode to the emergency operating mode in response to receiving an input signal indicating that the input actuator has been actuated.

DETAILED DESCRIPTION

An apparatus includes a set of network communication modules, a communication control module and an input actuator. Each network communication module from the set of network communication modules is configured to send signals to and receive signals from a remote device via a distinct communication mode from a set of communication modes. The communication control module is configured to automatically determine, based on a preconfigured network priority list and an availability of at least one communication mode from the set of communication modes, via which network communication module from the set of network communication modules to send a first status signal to the remote device when the communication control module is in a default operating mode. The communication control module is configured to periodically send a set of second status signals intended to be sent to the remote device via each communication mode from the set of communication modes when the communication control module is in an emergency operating mode and the communication mode is available. The communication control module is configured to switch from the default operating mode to the emergency operating mode in response to receiving an input signal indicating that the input actuator has been actuated.

In some embodiments, the apparatus can be a tracking device configured to communicate with the remote device via the set of communication modes. The tracking device can be configured to send a first status signal to the remote device indicating that the user of the tracking device is safe, not endangered, not threatened and/or unharmed. Similarly, the input actuator can be configured to allow the user of the tracking device to send one or more second status signals to the remote device indicating that the user of the tracking device is in need of assistance. For example, the user can activate and/or actuate the input actuator when the user is in an emergency situation. In some embodiments, actuation of the input actuator puts the tracking device into an emergency mode and causes the tracking device to send emergency signals to the remote device via each available communication mode supported by the tracking device. Geographic location information can also be sent to the remote device with the first status signal.

A method includes automatically determining, at a communication control module, an availability of a communication network from a set of communication networks. The communication network is included in a preconfigured network priority list. A first input signal indicating that a first input actuator has been actuated is received. The communication control module remains in a default mode after receiving the first input signal. A first status signal is sent, based on the first input signal, to a remote device via the communication network from the set of communications networks. A second input signal indicating that a second input actuator has been actuated is received. The communication control module is switched, in response to the second input signal, from the default mode to an emergency mode. A plurality of second status signals are periodically sent to the remote device via each communication network from the set of communication networks when the communication control module is in the emergency mode. An acknowledgement signal is received from the remote device indicating that the remote device received at least one second status signal from the set of second status signals. The communication control module is then disabled in response to receiving the acknowledgement signal.

An apparatus includes a first status actuator, a second status actuator and a communication control module having a first mode and a second mode. The communication control module is configured to send a first status signal to a remote device in response to the communication control module receiving an indication that the first status actuator has been actuated when the communication control module is in the first mode. The communication control module is configured to automatically send the first status signal via a first communication mode when the first communication mode is accessible. The communication control module is configured to automatically send the first status signal via a second communication mode when the first communication modue is unavailable. The first communication mode has a higher priority within a preconfigured network priority list than the second communication mode. The communication control module is configured to send a second status signal and a third status signal to the remote device via the first communication mode and the second communication mode, respectively, when the communication control module is in the second mode. The communication control module is configured to switch from the first mode to the second mode in response to receiving an indication that the second status actuator has been actuated.

As used in this specification, the singular forms "a," "an" and "the" include plural referents unless the context clearly dictates otherwise. Thus, for example, the term "a module" is intended to mean a single module or a combination of modules.

Figure 1:
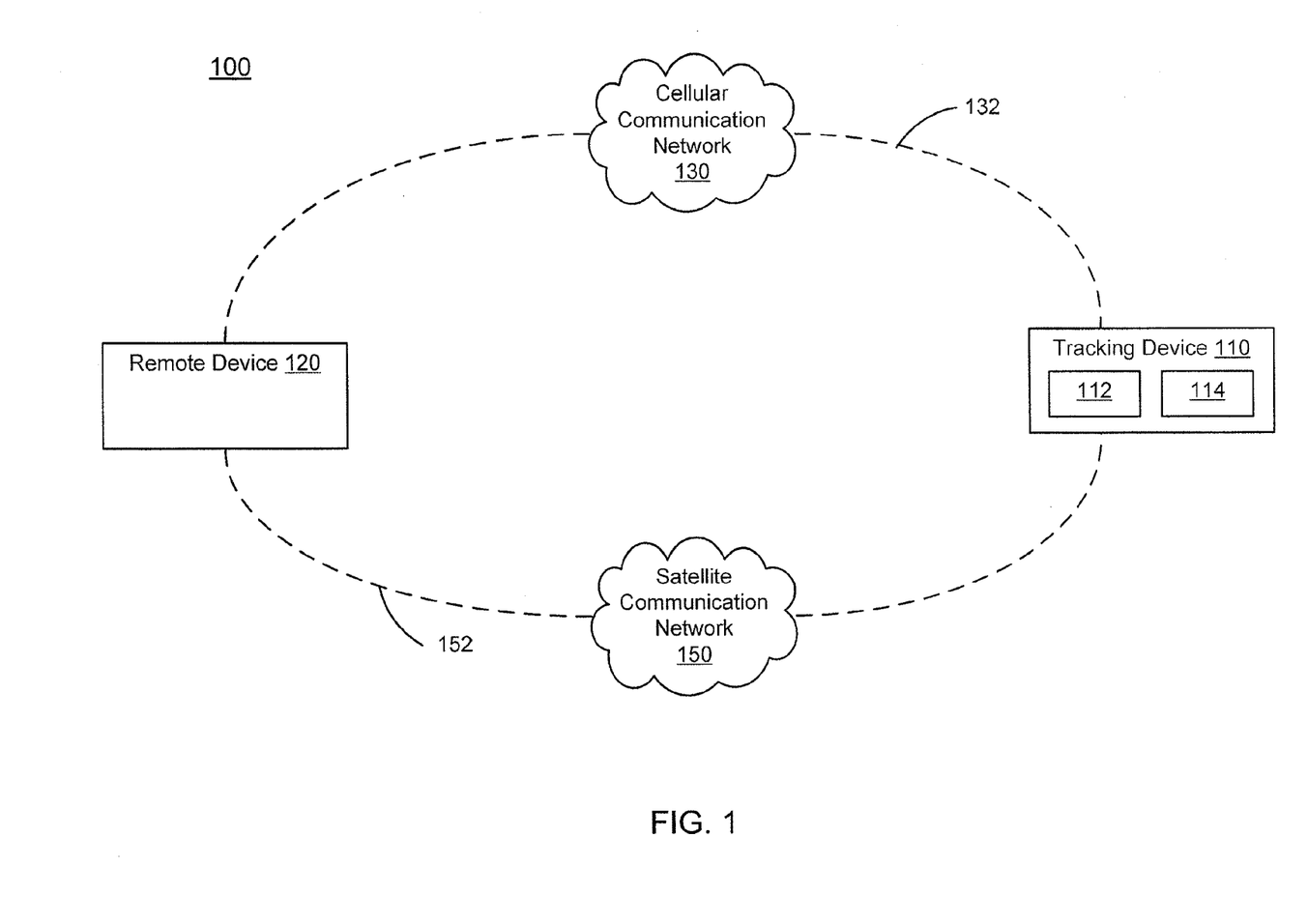
FIG. 1 is a schematic illustration of a tracking system, according to an embodiment.

FIG. 1 is a schematic illustration of a tracking system 100, according to an embodiment. The tracking system 100 includes a tracking device 110 and a remote device 120. The tracking device 110 is operatively coupled to the remote device 120 via one or more communication modes that use one or more communication networks. As shown in FIG. 1, for example, the tracking device 110 is operatively coupled to the remote device 120 via a cellular communication network 130 and a satellite communication network 150. More specifically, the cellular communication network 130 can operatively establish a data path 132 between the tracking device 110 and the remote device 120. Similarly, the satellite communication network 150 can operatively establish a data path 132 between the tracking device 110 and the remote device 120. Accordingly, the tracking device 110 can send data to and/or receive data from the remote device 120 via both the cellular communication network 130 and the satellite communication network 150.

The cellular communication network 130 can be any suitable cellular communication network that communicatively connects the tracking device 110 to the remote device 120. In some embodiments, for example, the cellular communication network 130 is a Global System for Mobile Communication (GSM) network, a Code Division Multiple Access (CDMA) network, a General Packet Radio Service (GPRS) network, an Enhanced Data Rates for GSM Evolution (EDGE) network, and/or the like. While shown in FIG. 1 as communicating with the remote device 120 via a single cellular communication network 130, in other embodiments the tracking device 110 can communicate with the remote device 120 via more than one cellular communication network 130. For example, in some embodiments the tracking device 110 can communicate with the remote device 120 via both a GSM network and a CDMA network.

The satellite communication network 150 can be any suitable satellite communication network that communicatively connects the tracking device 110 to the remote device 120. In some embodiments, for example, the satellite communication network 150 is a Low-Earth Orbiting (LEO) satellite network such as an Iridium satellite network, a Globalstar satellite network, and/or the like. In other embodiments, the satellite communication network 150 is a geostationary satellite network, and/or the like. While shown in FIG. 1 as communicating with the remote device 120 via a single satellite communication network 140, in other embodiments the tracking device 110 can communicate with the remote device 120 via more than one satellite communication network 140. For example, in some embodiments the tracking device 110 can communicate with the remote device 120 via both an Iridium satellite network and a Globalstar satellite network.

The remote device 120 can be any suitable computing device configured to communicate with the tracking device 110 via the cellular communication network 130 and the satellite communication network 150. More specifically, the remote device 120 can be configured to receive signals from the tracking device 110 and, based on the received signals, provide, display, and/or present status and/or location data associated with the tracking device 110. In some embodiments, for example, the remote device 120 can be a stationary computing device having a processor and a memory and located within a data operations center. In other embodiments, the remote device 120 can be a mobile computing device having a processor and a memory and being configured to monitor the tracking device 110.

The tracking device 110 can be any suitable computing device configured to communicate with a remote device. In some embodiments, for example, the tracking device 110 can be a mobile handheld computing device. In other embodiments, the tracking device can be integrated into a vehicle, a stationary location and/or the like.

The tracking device can include a power source, such as, for example, a battery (e.g., a lithium-ion polymer battery pack). In some embodiments, the tracking device can also receive power from a power cable configured to be operatively coupled to a power outlet. In some embodiments and as described in further detail herein, the tracking device can include embedded cellular, satellite and/or global positioning system (GPS) antennas and/or modems.

The tracking device 110 can include a user interface having a first input actuator 112 and a second input actuator 114. The first input actuator 112 can be any suitable user input device. In some embodiments, for example, the first input actuator 112 can be a physical button, an electrical button (e.g., as part of a touch screen input device), and/or the like. In other embodiments, the first input actuator 112 can be a biometric input device such as, for example, a fingerprint scanner, a microphone associated with voice recognition software, a retina scanner, and/or the like. In still other embodiments, the first input actuator 112 can be a barcode scanner, a proximity card reader and/or the like. The second input actuator 114 can be structurally similar to the first input actuator 112. As such, the second input actuator 114 can be any suitable user input device. In some embodiments, the tracking device 110 also includes a third input actuator (not shown in FIG. 1) that allows a user to actuate and/or turn-on the tracking device 110. In some embodiments, the user interface of the tracking device 110 includes only three input actuators. In other embodiments, the user interface of the tracking device 110 includes more or less than three input actuators.

As described in further detail herein, activation of the first input actuator 112 is configured to initiate transmission of a first status signal to the remote device 120 via the cellular communication network 130 and/or the satellite communication network 150. In some embodiments, activation of the first input actuator 112 can cause the tracking device 110 to send a signal indicating that a user of the tracking device 110 is safe, not endangered, not threatened and/or unharmed. In some embodiments, the first status signal can also include a geographic location of the tracking device 110.

In some embodiments, the first status signal can be sent, via the cellular communication network 130 and/or the satellite communication network 150, as a short message service (SMS) message, a short burst data (SBD) message, and/or in any other suitable format. As described in further detail herein, in some embodiments, the tracking device 110 can determine via which network (e.g., the cellular communication network 130 or the satellite communication network 150) to send the first status signal based on a network priority list, an availability of the networks, a signal strength of the networks, a geographic location of the tracking device 110, and/or the like.

The remote device 120 can receive and use the first status signal to monitor the status and/or location of the tracking device 110 and/or the user associated with the tracking device 110. In some embodiments, the remote device 120 can also track movement of the tracking device 110.

The second input actuator 114 is configured to initiate transmission of a second status signal to the remote device 120 via the cellular communication network 130 and/or the satellite communication network 150. In some embodiments, activation of the second input actuator 114 can cause the tracking device 110 to send one or more emergency signals to the remote device 120. Such emergency signals can notify the remote device 120 that the user of the tracking device 110 is in danger and/or otherwise is in need of assistance.

As described in further detail herein, in some embodiments, activation of the second input actuator 114 can cause the tracking device 110 to continuously and/or periodically send one or more emergency signals via one or more of the networks (e.g., the cellular communication network 130 and/or the satellite communication network 150) until the tracking device 110 receives an acknowledgement from the remote device 120 indicating that the remote device 120 received at least one emergency signal from the tracking device 110. In such embodiments, activation of the second input actuator 114 can be said to move the tracking device from a default operating mode to an emergency operating mode. As described in further detail herein, after receiving the acknowledgment signal from the remote device 120, the tracking device 110 can be automatically disabled, turned-off and/or shut-down.

Figure 2:
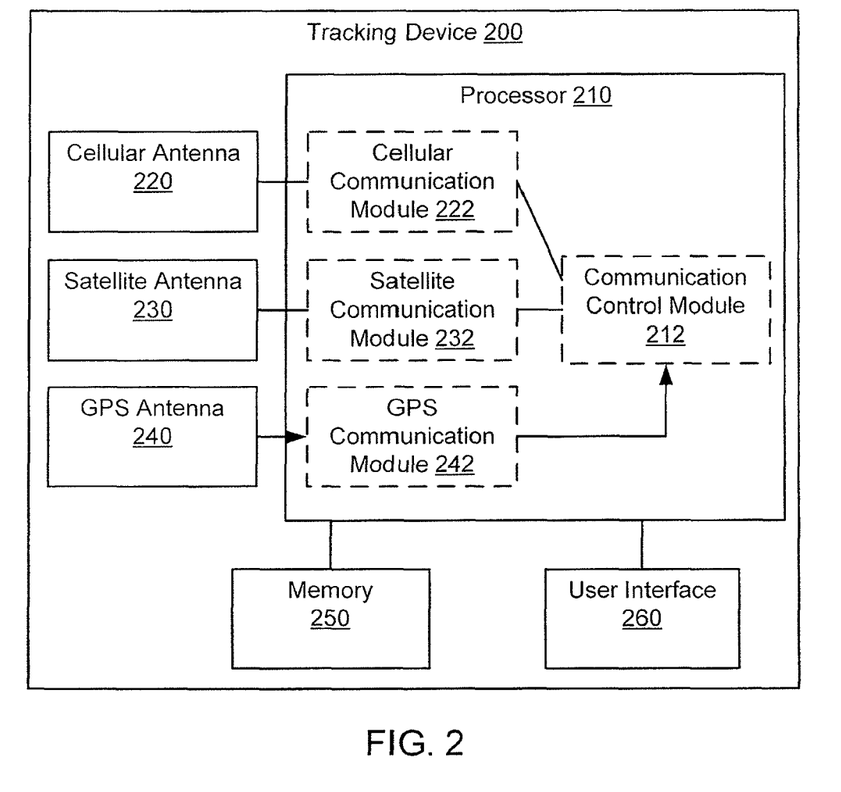
FIG. 2 is a schematic illustration of a tracking device, according to an embodiment.

FIG. 2 is a schematic illustration of a tracking device 200, according to another embodiment. The tracking device 200 can be similar to the tracking device 110 shown and described with respect to FIG. 1. Accordingly, the tracking device 200 can be configured to send and/or receive signals from a remote device (not shown in FIG. 2) via one or more cellular communication networks and/or satellite communication networks.

The tracking device 200 includes a processor 210, a cellular antenna 220, a satellite antenna 230, a global positioning system (GPS) receiver 240, a memory 250 and a user interface 260. In some embodiments, the tracking device 200 can be any suitable computing device configured to communicate with a remote device. In some embodiments, for example, the tracking device 200 can be a mobile handheld computing device. In other embodiments, the tracking device 200 can be integrated into a vehicle, a stationary location and/or the like. The tracking device 200 can include a power source, such as, for example, a battery (e.g., a lithium-ion polymer battery pack). In some embodiments, the tracking device 200 can also receive power from a power cable configured to be operatively coupled to a power outlet.

The user interface 260 can be any suitable user interface and, similar to the tracking device 110 shown and described with respect to FIG. 1, can include one or more input actuators (not shown in FIG. 2). For example, the user interface 260 can include one or more mechanical actuators, a display with one or more electronic actuators (e.g., as part of a touch-screen display), one or more biometric actuators, and/or the like. The actuators of the user interface 260 can be functionally similar to the actuators 112, 114, shown and described with respect to FIG. 1.

The cellular antenna 220 is configured to establish a connection with a cellular communication network. In some embodiments, for example, the cellular antenna 220 can be a CDMA antenna configured to establish and/or maintain a connection with a CDMA communication network. For another example, in some embodiments, the cellular antenna 220 can be a GSM antenna configured to establish and/or maintain a connection with a GSM network. In still other embodiments, the cellular antenna 220 can be any other suitable cellular antenna configured to establish and/or maintain a connection with a corresponding cellular network. In some embodiments, the cellular antenna 220 can interface with a cellular modem (not shown in FIG. 2) to facilitate communication with the cellular network.

Similar to the cellular antenna 220, the satellite antenna 230 is configured to establish a connection with a satellite communication network. In some embodiments, for example, the satellite antenna 230 can be a LEO antenna configured to establish and/or maintain a connection with a LEO satellite communication network (e.g., an Iridium satellite network, a Globalstar satellite network, etc.). For another example, in some embodiments, the satellite antenna 230 can be a geostationary satellite antenna configured to establish and/or maintain a connection with a geostationary satellite network. In still other embodiments, the satellite antenna 230 can be any other suitable satellite antenna configured to establish and/or maintain a connection with a corresponding satellite network. In some embodiments, the satellite antenna 230 can interface with a satellite modem (not shown in FIG. 2) to facilitate communication with the satellite network.

The GPS antenna 240 can be any suitable receiver configured to receive location information from a GPS satellite network. More specifically, the GPS antenna 240 can establish a connection with a GPS satellite network to determine a location of the tracking device 200. As discussed in further detail herein, the location information can be transmitted to a remote device with a status indicator.

The memory 250 can be any suitable memory configured to store information associated with the tracking device 200. In some embodiments, the memory can be, for example, a random access memory (RAM), a read only memory (ROM), a memory buffer, a hard drive, a database, an erasable programmable read only memory (EPROM), an electrically erasable programmable read only memory (EEPROM), flash memory and/or the like. As described in further detail herein, in some embodiments, the memory 250 can store instructions that cause the processor 210 to execute one or more modules and/or functions.

In some embodiments, the memory 250 can store configuration information associated with the tracking device 200. For example, the memory 250 can store a network priority list, a predefined beaconing interval for the device to transmit regular position updates and/or status updates to a remote device, a network availability polling interval, a parameter associated with the operation of the tracking device during an emergency mode, an encryption key associated with communication with the remote device, a location identifier associated with the remote device, and/or the like.

Figure 3:
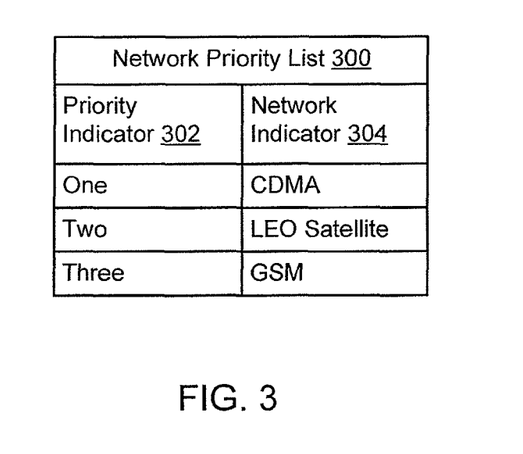
FIG. 3 is a schematic illustration of a network priority list, according to an embodiment.

FIG. 3 is a schematic illustration of a network priority list 300. The network priority list 300 includes a priority indicator column 302 and a network indicator column 304. The network indicator column 304 lists each communication mode (e.g., each cellular communication mode and each satellite communication mode) via which a tracking device is capable of communicating with a remote device. As shown in FIG. 3, for example, the tracking device is capable of communicating with a remote device via a CDMA network, a LEO satellite network and/or a GSM network.

Each communication mode is associated with a priority indicator in the priority indicator column 302. The priority indicator indicates a preference between the communication modes. Accordingly, as described in further detail herein, a communication control module of a tracking device will initially attempt to send signals (e.g., status indicators) to a remote device via the communication mode with the highest priority (e.g., CDMA in FIG. 3). If the communication mode with the highest priority is unavailable, the communication control module will attempt to send signals to the remote device via the communication mode with the next-highest priority (e.g., LEO Satellite in FIG. 3). If that communication mode is unavailable, the communication control module can continue to attempt to send signals via the communication mode with the next-highest priority until an available communication mode is identified.

In some embodiments, the network priority list 300 (and any other suitable parameter) can be predefined by a configuration application. Such a configuration application can be, for example, a program executed by a processor of the remote device and/or a separate configuration device. In such embodiments, the network priority list 300 can be initially configured by the configuration application upon initial configuration of the tracking device. Similarly, in some embodiments, the configuration application can be used to modify the network priority list 300 after initial configuration of the tracking device. In some embodiments, the network priority list 300 cannot be modified without the configuration application. Similarly stated, in some embodiments, a user of the tracking device cannot modify the network priority list 300 without the configuration application.

In some embodiments, the configuration application can also be used to initialize and/or modify other configuration parameters and/or functions of the tracking device. In such embodiments, for example, the configuration application can be used to define a beaconing interval for the device to transmit regular position updates and/or status updates to a remote device, define network availability polling intervals (i.e., an amount of time the communication control module attempts to connect to a network before attempting to connect to another network), establish network monitoring duration for incoming cellular messages, define emergency behavior of the tracking device, define distress beaconing protocol stages for the device, define a device encryption key for communication to and/or from the tracking device, provide a network address of the remote device to which the tracking device will send signals, activate a power saving mode, retrieve device information from the tracking device, and/or switch the tracking device from an emergency mode to a default mode. In some embodiments, the configuration application can initialize and/or modify the configuration parameters and/or functions of the tracking device (including the network priority list 300) remotely via a cellular communication network and/or a satellite communication network. In other embodiments, the configuration application can initialize and/or modify the configuration parameters and/or functions of the tracking device (including the network priority list 300) when the tracking device is physically coupled to a device executing the configuration application.

Returning to FIG. 2, the processor 210 can be any suitable processor and/or processing device configured to execute modules and/or functions associated with the tracking device 200. In some embodiments, the processor 210 can be a general purpose processor, a Field Programmable Gate Array (FPGA), an Application Specific Integrated Circuit (ASIC), a Digital Signal Processor (DSP), and/or the like. The processor 210 is operatively coupled to the memory 250 and can be configured to retrieve instructions and/or data from the memory 250. Additionally, the processor 210 can be configured to store data in and/or retrieve data from the memory 250.

The processor 210 can be configured to execute a communication control module 212, a cellular communication module 222, a satellite communication module 232 and a GPS communication module 242. The communication control module 212, the cellular communication module 222, the satellite communication module 232 and the GPS communication module 242 can be stored in the memory 250 and executed by the processor 210. In other embodiments, the communication control module 212, the cellular communication module 222, the satellite communication module 232 and the GPS communication module 242 can be hardware modules embodied in the processor 210.

The cellular communication module 222 can be configured to establish and facilitate communication with the remote device via a cellular communication network. More specifically, the cellular communication module 222 can instruct the cellular antenna 220 to attempt to establish a communication session with the cellular communication network. Additionally, the cellular communication module 222 can receive, prepare and/or format data to be sent to the remote device via the cellular communication network.

The satellite communication module 232 can be configured to establish and facilitate communication with the remote device via a satellite communication network. More specifically, the satellite communication module 232 can instruct the satellite antenna 230 to establish a communication session with the satellite communication network. Additionally, the satellite communication module 232 can receive, prepare and/or format data to be sent to the remote device via the satellite communication network.

The communication control module 212 can coordinate communication sent to the remote device. More specifically, the communication control module 212 can receive a signal from the user interface 260 indicating that an input status button has been activated. Similarly, the communication control module 212 can receive a signal that a periodic status indicator timer has expired. Based on the received signal (e.g., from the user interface 260 or based on the expiration of the timer), the communication control module 212 can automatically determine (e.g., based on a preconfigured network priority list, network availability, etc.) via which communication mode (e.g., cellular and/or satellite) to send a status signal and/or emergency signal. The communication module 212 can then send the appropriate signal to the appropriate communication module for transmission to the remote device.

The GPS communication module 242 is configured to receive data from and control operation of the GPS antenna 240. More specifically, the GPS communication module 242 can be configured to request location information from the GPS antenna 240. The GPS communication module 242 can provide the location information to the communication control module 212 such that the communication control module 212 can send the location information to the remote device via the cellular communication module 222 and/or the satellite communication module 232.

While shown in FIG. 2 as having a GPS communication module 242 and a GPS antenna 240, in other embodiments, the tracking device 200 does not include a GPS communication module 242 and/or a GPS antenna 240. In such embodiments, the tracking device 200 can use alternative methods to determine a location of the tracking device 200. In some embodiments, for example, the cellular communication module 222 can determine an approximate location of the tracking device 200 based on an identifier of a cellular network tower via which the cellular antenna 220 transmits signals. In other embodiments, for example, the cellular communication module 222 can use triangulation using three separate cellular network towers to determine an approximate location of the tracking device 200.

In use, a configuration application can initialize and set-up configuration parameters associated with the tracking device 200. For example, a user of the configuration application can configure a network priority list, a predefined beaconing interval for the device to transmit regular position updates and/or status updates to a remote device, a network availability polling interval (i.e., an amount of time the communication control module 212 attempts to connect to a network before attempting to connect to another network), a parameter associated with the operation of the tracking device during an emergency mode, an encryption key associated with communication with the remote device, a location identifier associated with the remote device, and/or the like. In some embodiments, the configuration application can initialize the configuration parameters such that a user of the tracking device 200 cannot modify the configuration parameters without the configuration application. Additionally, in some embodiments, the configuration application can initialize the tracking device 200 such that the configuration application can remotely modify and/or update the configuration parameters via a cellular communication network and/or a satellite communication network.

After the tracking device 200 is initialized, the communication control module 212 is in a default operating mode and the tracking device 200 can be used to track a user of the tracking device 200. For example, if the tracking device 200 is initialized to periodically send position and/or status information to the remote device, the communication control module 212 can periodically (e.g., upon expiration of a timer, at a predetermined time each day, etc.) initiate the transmission of position and/or status information. Similarly, if the user of the tracking device 200 activates a first input actuator on the user interface 260 (e.g., similar to first input actuator 112), the communication control module 212 can initiate the transmission of position and/or status information.

After receiving an indication (e.g., either a periodic indication or an indication from the user interface 260) to send position information, the communication control module 212 can retrieve such position information from the GPS communication module 242. More specifically, the communication control module 212 can request such position information from the GPS communication module 242. In response to the request, the GPS communication module 242 can instruct the GPS antenna 240 to retrieve position information from a GPS satellite network. After the GPS antenna 240 receives the position information, the GPS antenna 240 can forward the information to the communication control module 212 via the GPS communication module 242.

When initiating the transmission of position and/or status information, the communication control module 212 can automatically determine via which communication mode to send the position and/or status information to the remote device. The communication control module 212 can determine a communication mode with a highest priority using the predefined network priority list 300. For example, using the network priority list 300 of FIG. 3, the communication control module 212 can automatically determine that CDMA is the preferred method of communication. The communication control module 212 can attempt to establish a connection to the CDMA network via a CDMA communication module (e.g., the cellular communication module 222 configured as a CDMA communication module) and a CDMA antenna (e.g., the cellular antenna 220 configured as a CDMA antenna). In some embodiments, a network availability polling interval configuration parameter indicates a period of time during which the communication control module 212 attempts to establish the connection.

If, after expiration of the network availability polling interval time limit, a connection has not been established, the communication control module 212 can query the network priority list 300 for the communication mode with the next highest priority. Using the example in FIG. 3, the communication control module 212 can attempt to establish a connection with a LEO satellite network via a LEO satellite communication module (e.g., the satellite communication module 232 configured as a LEO satellite communication module) and a LEO satellite communication antenna (e.g., the satellite antenna 230 configured as a LEO satellite antenna). If, after expiration of the network availability polling interval time limit, a connection has not been established, the communication control module 212 can once again query the network priority list 300 for the communication mode with the next highest priority. This can occur until an available communication mode is identified or each of the communication modes listed in the network priority list is deemed unavailable. In some embodiments, if each of the communication modes listed in the network priority list is deemed unavailable, the communication control module 212 can wait to attempt to establish a connection with a communication mode until expiration of a predetermined time period. After determining the highest priority available communication network, the communication control module can initiate sending the position and/or status information to the remote device via the appropriate communication mode 222, 232 and antenna 220, 230.

The communication control module 212 can be configured to switch from the default operating mode to an emergency operating mode in response to receiving a signal indicating that a user of the tracking device has activated a second input actuator on the user interface 260. In some embodiments, when the communication control module 212 is in the emergency operating mode, the communication control module 212 can periodically attempt to send an emergency signal to the remote device via each of the communication modes supported by the tracking device 200. For example, the tracking device 200 can periodically attempt to send an emergency signal via each of the CDMA network, the LEO satellite network and the GSM network. Similarly stated, the communication control module 212 can, upon receiving an indication that the second input actuator has been actuated, initiate sending an emergency signal via each of the CDMA network, the LEO satellite network and the GSM network. In some embodiments, emergency signals can be sent via each of the communication modes simultaneously and/or in parallel. Similarly stated, in some embodiments, the communication control module 212 can send an emergency signal via each of the communication modes at substantially the same time. In other embodiments, the communication control module 212 can send an emergency signal via each of the communication modes serially (e.g., one after the other).

A predetermined time period after the initial emergency signals are sent, the communication control module 212 can again initiate sending an emergency signal via each of the CDMA network, the LEO satellite network and the GSM network. In some embodiments, this can continue until an acknowledgement signal is received from the remote device indicating that the remote device received at least one of the emergency signals.

In some embodiments, when the communication control module 212 is in the emergency operating mode, the tracking device 200 appears to be turned-off, shut-down and/or disabled even though the control module 212 may be actively transmitting. Additionally, in some embodiments, upon receipt of the acknowledgement signal from the remote device, the communication control module 212 disables, turns-off, and/or shuts-down the tracking device 200. In some embodiments, the communication control module 212 cannot be switched from the emergency operating mode to the default operating mode by the user of the tracking device 200 without the configuration application.

Figure 4:
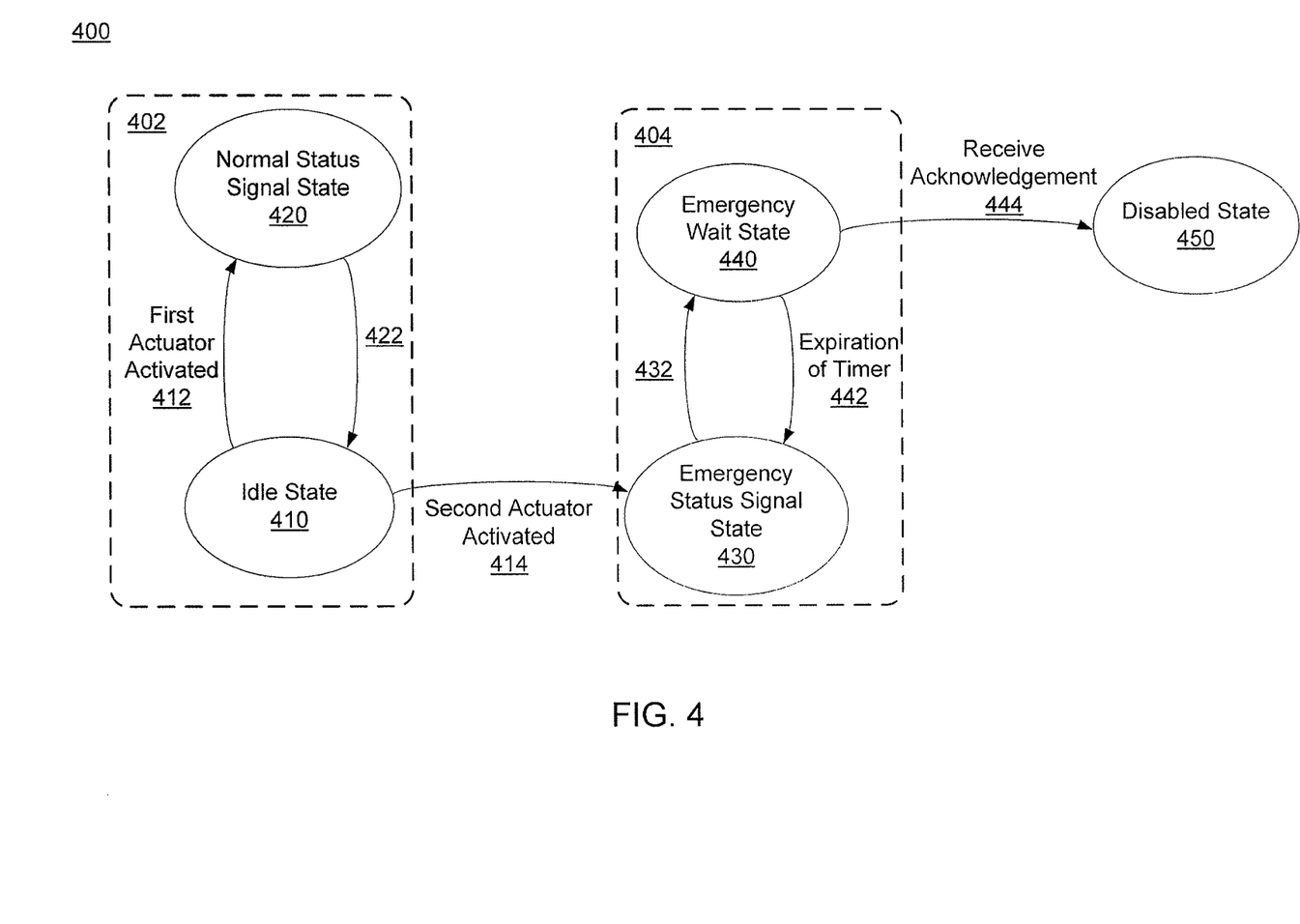
FIG. 4 is a state diagram illustrating states of a communication control module of a tracking device, according to an embodiment.

FIG. 4 is a state diagram 400 illustrating states of a communication control module (e.g., communication control module 212, shown and described with respect to FIG. 2) of a tracking device (e.g., tracking device 110 or 200, shown and described with respect to FIGS. 1 and 2, respectively), according to another embodiment. The state diagram 400 illustrates transitions between the different states of the communication control module.

After the tracking device is initialized and configured by a configuration application, the communication control module is in the idle state 410. The idle state 410 can also be referred to as a default state. When in the idle state 410, the communication control module of the tracking device waits for an event such as an actuator being activated, a periodic timer expiring, and/or the like. As shown in FIG. 4, for example, when the first actuator is activated 412, the communication control module transitions to the normal status signal state 420. When in the normal status signal state 420, the communication control module can initiate sending a status signal to a remote device via a communication mode. As discussed above, the status signal can provide an indication of a position of the tracking device, that the user of the tracking device is safe, not endangered, not threatened and/or unharmed. Additionally, as discussed above, the communication control module can automatically determine via which communication mode (e.g., from one or more cellular communication modes or one or more satellite communication modes) to send the status signal using a predefined network priority list, an availability of each communication mode, and/or the like. After sending the status signal the communication control module returns to the idle state 410, as illustrated by 422. Accordingly, it can be said that the normal status signal state 420 and the idle state 410 collectively define a default and/or normal operating mode 402.

For another example, in some embodiments periodic status signals are sent to the remote device. In such embodiments, the communication control module transitions from the idle state 410 to the normal status signal state 420 upon expiration of a timer, at certain predefined times and/or the like. After the periodic status signal is sent, the communication control module returns to the idle state 410. In some embodiments, the timer can be reset upon returning to the idle state 410.

As shown in FIG. 4, when the second actuator is activated 414, the communication control module transitions to an emergency status signal state 430. In the emergency status signal state 430, the communication control module initiates sending an emergency signal to the remote device via each communication mode supported by the tracking device. More specifically, when in the emergency status signal state 430, the communication control module causes the tracking device to attempt to send an emergency status signal to a remote device via each cellular communication mode and each satellite communication mode supported by the tracking device.

In some embodiments, when in the emergency status signal state 430, emergency signals can be sent via each of the communication modes simultaneously and/or in parallel. Similarly stated, in some embodiments, the communication control module can send an emergency signal via each of the communication modes at substantially the same time. In other embodiments, when in the emergency status signal state 430, the communication control module can send an emergency signal via each of the communication modes serially (e.g., one after the other).

After attempting to send the emergency status signals, the communication control module transitions from the emergency status signal state 430 to the emergency wait state 440, as illustrated by 432. Upon entering the emergency wait state 440, a timer is started and/or initiated. In some embodiments, the timer value is predefined and/or modified by the configuration application. Upon expiration of the timer 442, the communication control module transitions to the send emergency status signal state 430. As discussed above, when in the emergency status signal state 430, the communication control module initiates sending an emergency signal to the remote device via each communication mode supported by the tracking device. After attempting to send the emergency status signals, the communication control module once again transitions from the emergency status signal state 430 to the emergency wait state 440, as illustrated by 432. Accordingly, it can be said that the emergency wait state 440 and the emergency status signal state 430 collectively define an emergency mode 404 in which the communication control module periodically attempts to send emergency status signals to the remote device via each communication mode supported by the tracking device.

As discussed above, in some embodiments, when the communication control module is in the emergency mode 404, the tracking device can appear to be turned-off, shut-down and/or disabled. Additionally, in some embodiments, a user of the tracking device is unable to switch the communication control module from the emergency wait state 440 to the idle state 410 without using a configuration application on a separate device (e.g., the remote device).

The communication control module remains in the emergency mode 404 until receiving an acknowledgement signal 444 from the remote device. The acknowledgement signal indicates that the remote device has received at least one emergency signal from the tracking device. After receiving an acknowledgement signal 444, the communication control module transitions from the emergency wait state 440 to the disabled state 450.

The communication control module is inoperable and/or disabled in the disabled state 450. Similarly stated, the communication control module shuts-down, turns-off and/or disables the tracking device when in the disabled state 450. When in the disabled state 450, the tracking device is inoperable such that a user of the tracking device is unable to remove the communication control module from the disabled state 450, activate the tracking device and/or otherwise use the tracking device without the aid of a configuration application executing on a separate device (e.g., the remote device). In some embodiments, the configuration application can remotely (e.g., via one of a cellular network or a wireless network) enable the communication control module (e.g., switch the communication control module from the disabled state 450 to the idle state 410). In other embodiments, the configuration application can switch the communication control module from the disabled state 450 to the idle state 410 when the tracking device is physically coupled to the device executing the configuration application.

Figure 5:
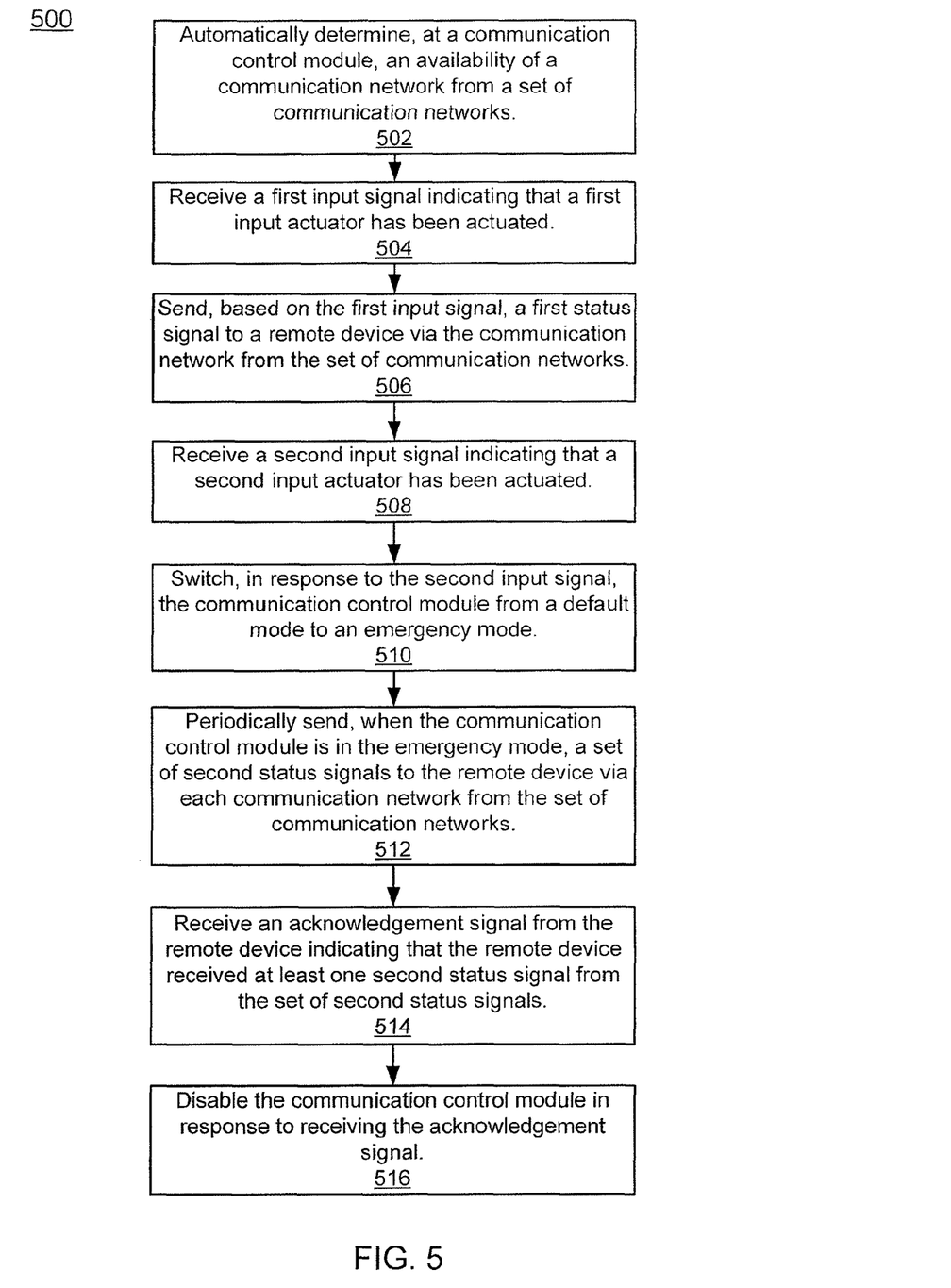
FIG. 5 is a flow chart of a method of providing an emergency tracking function, according to an embodiment.

FIG. 5 is a flow chart of a method 500 of providing an emergency tracking function, according to another embodiment. The method 500 includes automatically determining, at a communication control module, an availability of a communication network from a set of communication networks, at 502. In some embodiments, the set of communication networks can include one or more satellite communication networks (e.g., a LEO satellite network such as an Iridium satellite network, a Globalstar satellite network, a geostationary satellite network, and/or the like) and/or one or more cellular communication networks (e.g., a GSM network, a CDMA network, a GPRS network, an EDGE network, and/or the like). In some embodiments, as described above, the communication control module can automatically determine an availability of a communication network based on a priority of that network in a network priority list.

A first input signal indicating that a first input actuator has been actuated is received, at 504. More specifically, a user of a tracking device can actuate the first input actuator. A first status signal is sent, based on the first input signal, to a remote device via the communication network from the set of communication networks, at 506. In some embodiments, the first input actuator can be a normal and/or default input actuator. Accordingly, the user of the tracking device can actuate the first input actuator when the user intends to transmit a signal to the remote device indicating that the user is safe, not endangered, not threatened and/or unharmed. The communication control module remains in a default mode in response to receiving the first input signal.

A second input signal indicating that a second input actuator has been actuated is received, at 508. The communication control module is switched, in response to the second input signal, from the default mode to an emergency mode, at 510. A set of second status signals is periodically sent to the remote device via each communication network from the set of communication networks when the communication control module is in the emergency mode, at 512. Similarly stated, a second status signal is sent using each communication mode via which the tracking device is capable of sending data.

An acknowledgement signal is received from the remote device indicating that the remote device received at least one second status signal from the set of status signals, at 514. The communication control module is disabled in response to receiving the acknowledgement signal, at 516. Similarly stated, the communication control module is inoperable until reset by a configuration application executed at a computing device.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

As described above, in some embodiments, the tracking device can be a mobile handheld tracking device. In such embodiments, the tracking device can be configured to interface with a vehicle docking system. The vehicle docking system can provide the tracking device with an interface to the various systems and capabilities of the vehicle. Through this interface, the tracking device can receive power from the vehicle (e.g., for operation and/or to recharge an internal battery of the tracking system), use antennas associated with the vehicle (e.g., mounted on the exterior of the vehicle), and/or the like. In some embodiments, when the tracking device is removed from the vehicle docking system, the device can automatically switch to internal battery power and can use the embedded internal antennas (e.g., GPS antenna, cellular antenna and/or satellite antenna).

While shown and described above as using a configuration application to manage, modify and/or initiate settings of the tracking device, in other embodiments, the user can manage, modify and/or initiate some settings. In some embodiments, for example, the user of the tracking device can modify power consumption settings of the device, such as, the beaconing behavior of the device, polling intervals of the device, and/or the like. This allows a user to configure the device for a specific use scenario under actual conditions.

In some embodiments, communication between the tracking device and the remote device is encrypted. In some embodiments, for example, the communication can be encrypted using the Advanced Encryption Standard (AES). In such embodiments, the encryption can be AES-128, AES-192 or AES-256. In other embodiments, any other suitable encryption methodology and/or standard can be used. In some embodiments, each tracking device can be configured to have a unique encryption key. Accordingly, the compromise of any single tracking device does jeopardize the communications of other tracking devices.

In some embodiments, a beacon interval can be set (e.g., using a configuration application) for both the default mode and the emergency mode of the communication control module. The beacon interval is the amount of time between periodic transmission of signals. Thus, for example, a tracking device can be configured to transmit a periodic normal status signal (e.g., move between the idle state 410 and the normal status signal state 420 as shown in FIG. 4) every minute, 15 minutes, 30 minutes, and/or any other suitable time period when in the default mode. Similarly, the tracking device can be configured to transmit a periodic emergency signal (e.g., move between the emergency wait state 440 and the emergency status signal state 430 as shown in FIG. 4) every 15 seconds, 30 seconds, 15 minutes, and/or the like. The beacon interval for the default mode can be the same or different than the beacon interval for the emergency mode.

In some embodiments, the tracking device can include a status indicator that indicates when the tracking device is operating in the default mode. Such a status indicator can be, for example, a light emitting diode, an icon on a display, and/or the like. In some embodiments, a status indicator is not displayed when the tracking device is in an emergency mode and appears to be disabled and/or turned-off.

In some embodiments, the antennas, modems and/or modules associated with a communication mode are powered-down, turned-off and/or in a standby state when not in use. For example, when the tracking device is transmitting a status signal via a satellite communication mode, the satellite antenna, modem and/or module can be powered-down, turned-off and/or in a standby state. This can reduce unnecessary power consumption and prolong the battery operation of the tracking device.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
a plurality of network communication modules, each network communication module from the plurality of network communication modules configured to send signals to and receive signals from a remote device via a distinct communication mode from a plurality of communication modes; and
a communication control module configured to automatically determine, based on a preconfigured network priority list and an availability of at least one communication mode from the plurality of communication modes, via which network communication module from the plurality of network communication modules to send a first status signal to the remote device when the communication control module is in a default operating mode, the communication control module configured to periodically send a plurality of second status signals intended to be sent to the remote device via each communication mode from the plurality of communication modes when the communication control module is in an emergency operating mode and the communication mode is available; and
an input actuator, the communication control module configured to switch from the default operating mode to the emergency operating mode in response to receiving an input signal indicating that the input actuator has been actuated.

2. The apparatus of claim 1, wherein the plurality of communication modes includes at least one of a Global System for Mobile Communications (GSM) network, a Code Division Multiple Access (CDMA) network, and a low-earth orbiting (LEO) satellite network.

3. The apparatus of claim 1, wherein the preconfigured network priority list is configured to be modified using a configuration tool, the preconfigured network priority list being modifiable only by the configuration tool.

4. The apparatus of claim 1, wherein the input actuator is a first input actuator, the apparatus further comprising:
a second input actuator, the communication control module configured to send the first status signal to the remote device in response to receiving an input signal indicating that the second input actuator has been actuated.

5. The apparatus of claim 1, wherein the communication module is configured to encrypt the first status signal prior to sending the first status signal to the remote device.

6. The apparatus of claim 1, wherein the first status signal includes one of a short message service (SMS) message and a short burst data (SBD) message.

7. The apparatus of claim 1, wherein the communication control module is configured to receive an acknowledgment signal from the remote device in response to the remote device receiving at least one second status signal from the plurality of second status signals, the communication control module configured to be disabled in response to receiving the acknowledgement signal.

8. The apparatus of claim 1, further comprising:
a status indicator configured to provide an indication on the apparatus when the communication control module is in the default operating mode.

9. The apparatus of claim 1, wherein the communication control module is configured to modify the preconfigured network priority list in response to receiving a configuration command from a configuration tool located remote from the communication control module.

10. A non-transitory processor-readable medium storing code representing instructions to cause a processor to:
automatically determine, at a communication control module, an availability of a communication network from a plurality of communication networks, the communication network included in a preconfigured network priority list;
receive a first input signal indicating that a first input actuator has been actuated, the communication control module remaining in a default mode after receiving the first input signal;
send, based on the first input signal, a first status signal to a remote device via the communication network from the plurality of communication networks;
receive a second input signal indicating that a second input actuator has been actuated;
switch, in response to the second input signal, the communication control module from the default mode to an emergency mode;
periodically send, when the communication control module is in the emergency mode, a plurality of second status signals to the remote device via each communication network from the plurality of communication networks;
receive an acknowledgement signal from the remote device indicating that the remote device received at least one second status signal from the plurality of second status signals; and
disable the communication control module in response to receiving the acknowledgement signal.

11. The non-transitory processor-readable medium of claim 10, wherein the communication network from the plurality of communication networks is one of a Global System for Mobile Communications (GSM) network, a Code Division Multiple Access (CDMA) network, and a low-earth orbiting (LEO) satellite network.

12. The non-transitory processor-readable medium of claim 10, wherein the preconfigured network priority list is configured to be modified using a configuration tool, the preconfigured network priority list being modifiable only by the configuration tool.

13. The non-transitory processor-readable medium of claim 10, further comprising code representing instructions to cause the processor to:
encrypt the first status signal prior to executing the code representing instructions to cause the processor to send the first status signal to the remote device.

14. The non-transitory processor-readable medium of claim 10, wherein the first status signal includes one of a short message service (SMS) message and a short burst data (SBD) message.

15. The non-transitory processor-readable medium of claim 10, wherein the code representing instructions to cause the processor to periodically send includes code representing instructions to cause the processor to send the plurality of second status signals one of simultaneously or serially.

16. An apparatus, comprising:
a first status actuator;
a second status actuator; and
a communication control module having a first mode and a second mode, the communication control module configured to send a first status signal to a remote device in response to the communication control module receiving an indication that the first status actuator has been actuated when the communication control module is in the first mode, the communication control module configured to automatically send the first status signal via a first communication mode when the first communication mode is accessible, the communication control module configured to automatically send the first status signal via a second communication mode when the first communication mode is unavailable, the first communication mode having a higher priority within a preconfigured network priority list than the second communication mode,
the communication control module configured to send a second status signal and a third status signal to the remote device via the first communication mode and the second communication mode, respectively, when the communication control module is in the second mode, the communication control module configured to switch from the first mode to the second mode in response to receiving an indication that the second status actuator has been actuated.

17. The apparatus of claim 16, wherein the second status signal is one from a plurality of second status signals, the communication control module is configured to periodically send the second status signal from the plurality of second status signals when the communication control module is in the second mode.

18. The apparatus of claim 16, wherein the communication control module is configured to be inoperable in a third mode, the communication control module switching from the second mode to the third mode in response to receiving an acknowledgement signal indicating that the remote device received at least one of the second status signal or the third status signal.

19. The apparatus of claim 16, wherein the first communication mode is one of a Global System for Mobile Communications (GSM) network, a Code Division Multiple Access (CDMA) network, and a low-earth orbiting (LEO) network, the second communication mode being a different one of the GSM network, the CDMA network, and the LEO satellite network.

20. The apparatus of claim 16, wherein the communication module is configured to encrypt the first status signal prior to sending the first status signal to the remote device.

21. The apparatus of claim 16, further comprising:
a first network communication module configured to facilitate communication between the communication control module and the remote device via the first communication mode; and
a second network communication module configured to facilitate communication between the communication control module and the remote device via the second communication mode, the second network communication module being inoperable when the communication control module sends the first status signal to the remote device via the first communication mode.

22. The apparatus of claim 16, wherein the first status signal includes one of a short message service (SMS) message and a short burst data (SBD) message.

23. The apparatus of claim 16, wherein the communication control module is configured to modify the preconfigured network priority list in response to receiving a configuration command from a configuration tool located remote from the communication control module.

* * * * *